United States Patent
DeChristopher

(10) Patent No.: US 10,820,495 B2
(45) Date of Patent: Nov. 3, 2020

(54) KNIFE DRIVE WITH INTEGRAL HYDRAULIC MOTOR FOR A HEADER OF AN AGRICULTURAL HARVESTER

(71) Applicant: CNH Industrial America LLC, New Holland, PA (US)

(72) Inventor: David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 45 days.

(21) Appl. No.: 16/006,121

(22) Filed: Jun. 12, 2018

(65) Prior Publication Data

US 2019/0373807 A1 Dec. 12, 2019

(51) Int. Cl.
| | | |
|---|---|---|
| *A01D 34/38* | (2006.01) | |
| *A01D 34/04* | (2006.01) | |
| *A01D 34/14* | (2006.01) | |
| *F04C 2/18* | (2006.01) | |

(52) U.S. Cl.
CPC ............ *A01D 34/38* (2013.01); *A01D 34/04* (2013.01); *A01D 34/14* (2013.01); *F04C 2/18* (2013.01)

(58) Field of Classification Search
CPC ........ A01D 34/38; A01D 34/14; A01D 34/04; A01D 34/30; A01D 34/145; A01D 34/02; F04C 2/18; F16H 43/00; Y10T 74/18528; Y10T 74/18256
See application file for complete search history.

(56) References Cited

U.S. PATENT DOCUMENTS

| | | | | |
|---|---|---|---|---|
| 1,814,649 | A | | 7/1937 | Wade |
| 3,246,528 | A | | 4/1966 | Kosch |
| 4,866,921 | A | * | 9/1989 | Nagashima ............ A01D 34/30 56/257 |
| 4,909,025 | A | * | 3/1990 | Reissig ................ A01D 34/305 56/257 |
| 5,497,605 | A | * | 3/1996 | Underwood ........... A01D 34/30 56/14.6 |
| 7,401,458 | B2 | | 7/2008 | Priepke |
| 7,520,118 | B1 | | 4/2009 | Priepke |
| 7,730,709 | B2 | | 6/2010 | Priepke |
| 7,805,919 | B2 | * | 10/2010 | Priepke ................ A01D 41/142 56/257 |
| 8,011,272 | B1 | | 9/2011 | Bich et al. |
| 8,151,547 | B2 | | 4/2012 | Bich et al. |

(Continued)

FOREIGN PATENT DOCUMENTS

| | | |
|---|---|---|
| CN | 202197573 U | 4/2012 |
| FR | 1350562 A | 1/1964 |
| GB | 1065347 A | 4/1967 |

OTHER PUBLICATIONS

Extended European Search Report for EP Application No. 19179177.1 dated Sep. 23, 2019 (10 pages).

*Primary Examiner* — Arpad Fabian-Kovacs
(74) *Attorney, Agent, or Firm* — Patrick Sheldrake; Peter Zacharias

(57) ABSTRACT

A header for an agricultural harvester comprising first and second drive arm assemblies for connecting to respective cutting assemblies, and a drive unit consisting essentially of a hydraulic motor operatively connected to the first and second drive arm assemblies. Operation of the drive unit results in substantially linear and opposed oscillating motion of the cutting assemblies.

20 Claims, 7 Drawing Sheets

(56) References Cited

U.S. PATENT DOCUMENTS

| | | | |
|---|---|---|---|
| 9,532,502 B2 * | 1/2017 | Cook | A01D 34/30 |
| 9,545,051 B2 | 1/2017 | Cook et al. | |
| 9,668,407 B2 * | 6/2017 | Cook | A01D 34/145 |
| 9,924,635 B1 * | 3/2018 | Lopez | A01D 34/04 |
| 10,212,884 B2 * | 2/2019 | Webermann | A01D 41/142 |
| 2008/0148701 A1 * | 6/2008 | Priepke | A01D 34/145 56/17.6 |
| 2009/0145097 A1 * | 6/2009 | Priepke | A01D 34/30 56/257 |
| 2009/0145264 A1 * | 6/2009 | Priepke | A01D 34/30 74/84 R |
| 2011/0078989 A1 * | 4/2011 | Bich | A01D 34/145 56/14.5 |
| 2011/0099964 A1 * | 5/2011 | Coers | A01D 41/14 56/296 |
| 2014/0130472 A1 * | 5/2014 | Cook | A01D 34/30 56/16.4 R |
| 2014/0190139 A1 * | 7/2014 | Cook | A01D 34/145 56/10.1 |
| 2014/0215991 A1 * | 8/2014 | Brimeyer | A01D 34/30 56/14.7 |
| 2014/0318094 A1 | 10/2014 | Cook et al. | |
| 2014/0345239 A1 | 11/2014 | Cook et al. | |
| 2015/0163994 A1 * | 6/2015 | Bich | A01D 34/14 56/299 |
| 2015/0305233 A1 * | 10/2015 | Surmann | A01D 34/135 56/10.1 |
| 2016/0066503 A1 * | 3/2016 | Cook | A01D 34/30 56/257 |
| 2017/0086368 A1 * | 3/2017 | Cook | A01D 34/30 |
| 2017/0105344 A1 * | 4/2017 | Webermann | A01D 41/142 |
| 2017/0265383 A1 * | 9/2017 | Cook | A01D 34/145 |
| 2019/0357438 A1 * | 11/2019 | Zumbach | A01D 41/142 |

* cited by examiner

KNIFE DRIVE WITH INTEGRAL HYDRAULIC MOTOR FOR A HEADER OF AN AGRICULTURAL HARVESTER

The exemplary embodiments of present invention relate generally to a knife drive for a header of a plant cutting machine (e.g., a combine harvester) and, more specifically, to a knife drive having a drive unit in the form of a hydraulic motor operatively connected to first and second drive arm assemblies which, in turn, are each respectively connected to cutting assemblies.

BACKGROUND OF THE DISCLOSURE

An agricultural harvester, e.g., a plant cutting machine, such as, but not limited to, a combine or a windrower, generally includes a header operable for severing and collecting plant or crop material as the harvester is driven over a crop field. The header has a plant cutting mechanism, such as a cutter bar, for severing the plants or crops via, for example, an elongate sickle mechanism that reciprocates sidewardly relative to a non-reciprocating guard structure. After the crops are cut, they are collected inside the header and transported via a conveyor, such as a draper belt, towards a feederhouse located centrally inside the header.

Drive units operate first and second cutter bar knife drives or drive arm assemblies that oscillate respective cutting assemblies, in the form of first and second sickle mechanisms, in opposite directions in order to cut the crop or crops. However, conventional drive units include a hydraulic motor located external to the drive unit gearbox. The external hydraulic motor itself, as well as gears driven by the external hydraulic motor which drives subsequent gears within a gearbox, add space, weight and complexity to the overall drive unit and header.

BRIEF SUMMARY OF THE DISCLOSURE

In accordance with an exemplary embodiment of the present disclosure there is provided a knife drive for a header for an agricultural harvester comprising first and second drive arm assemblies for connecting to respective cutting assemblies, and a drive unit consisting essentially of a hydraulic motor operatively connected to the first and second drive arm assemblies.

An aspect of this exemplary embodiment is that the hydraulic motor can include a pair of gears rotatable about substantially vertical axes, and wherein the first and second drive arm assemblies are substantially coplanar with the pair of gears of the hydraulic motor. The hydraulic motor can comprise a housing, a hydraulic fluid inlet in fluid communication with an interior of the housing, and a hydraulic fluid outlet in fluid communication with the interior of the housing.

Another aspect of this exemplary embodiment is that the hydraulic motor can further comprise a first gear and a second gear operatively engaged with the first gear, each housed within the housing, and wherein the hydraulic fluid inlet and outlet can each be positioned between the first and second gears. In another aspect of this exemplary embodiment the housing includes internal passageways to direct flow of hydraulic fluid downstream from the hydraulic fluid inlet.

Another aspect of this exemplary embodiment is that the hydraulic motor can include a first gear and a second gear, and can further comprise a first crank arm operatively connected to one of the first and second gears and the first drive arm assembly. The knife drive can further comprise a second crank arm operatively connected to the other of the first and second gears and the second drive arm assembly.

Another aspect of this exemplary embodiment is that the hydraulic motor can be a hydraulic vane motor, a hydraulic gear motor, a hydraulic piston motor, or a hydraulic gerotor motor.

In accordance with another exemplary embodiment of the present disclosure there is provided a header for an agricultural harvester comprising a knife drive including first and second drive arm assemblies for connecting to respective cutting assemblies, and a drive unit consisting essentially of a hydraulic motor operatively connected to the first and second drive arm assemblies.

In accordance with another exemplary embodiment of the present disclosure there is provided a knife drive for a header for an agricultural harvester comprising first and second drive arm assemblies for connecting to respective cutting assemblies, and a drive unit operatively connected to the first and second drive arm assemblies. The drive unit includes a housing, a first gear and a second gear operatively connected to the first gear, each housed within the housing, and a hydraulic fluid inlet and a hydraulic fluid outlet, each in fluid communication with an interior of the housing.

Exemplary aspects of this embodiment is that the housing can be hermetically sealed, and that the hydraulic fluid inlet and hydraulic fluid outlet can each be positioned between the first and second gears.

Another aspect of this exemplary embodiment is that the knife drive further comprises a first crank arm operatively connected to one of the first and second gears and to the first drive arm assembly, and a second crank arm operatively connected to the other of the first and second gears and to the second drive arm assembly.

In accordance with another exemplary embodiment of the present disclosure there is provided a header for an agricultural harvester comprising a cutting mechanism that includes a drive mechanism consisting essentially of a knife drive comprising first and second drive arm assemblies, and a drive unit operatively connected to the first and second drive arm assemblies. The drive unit includes a housing, a first gear and a second gear operatively connected to the first gear, each housed within the housing, and a hydraulic fluid inlet and a hydraulic fluid outlet, each in fluid communication with an interior of the housing.

In accordance with the exemplary embodiments, the present disclosure provides for a compact drive unit consisting essentially of a hydraulic motor operatively connected to first and second drive arm assemblies. The gears of the hydraulic motor function not only to drive the first and second drive arm assemblies, but also to time the operation of the first and second drive arm assemblies, whereby the respective cutting assemblies operatively connected to the first and second drive arm assemblies oscillate in opposite directions so as to effectively cancel out vibration during operation of the cutting assemblies. In addition, by eliminating the separate external hydraulic motor, drive shaft and driven gear of conventional center knife drives, the drive units of the present disclosure have less mass and are lighter in weight, advantageously requiring less energy to from the combine to lift the header. Also, there is less mass to float on the ground thereby reducing the likelihood of the cutting assemblies impacting or digging into the ground during operation.

Other features and advantages of the present disclosure will be apparent from the following more detailed description of the exemplary embodiments.

BRIEF DESCRIPTION OF THE SEVERAL VIEWS OF THE DRAWINGS

The foregoing summary, as well as the following detailed description of the exemplary embodiments of the present disclosure, will be better understood when read in conjunction with the appended drawings. For the purpose of illustrating the present disclosure, there are shown in the drawings exemplary embodiments. It should be understood, however, that the present disclosure is not limited to the precise arrangements and instrumentalities shown.

DETAILED DESCRIPTION OF THE DISCLOSURE

Figure 1:
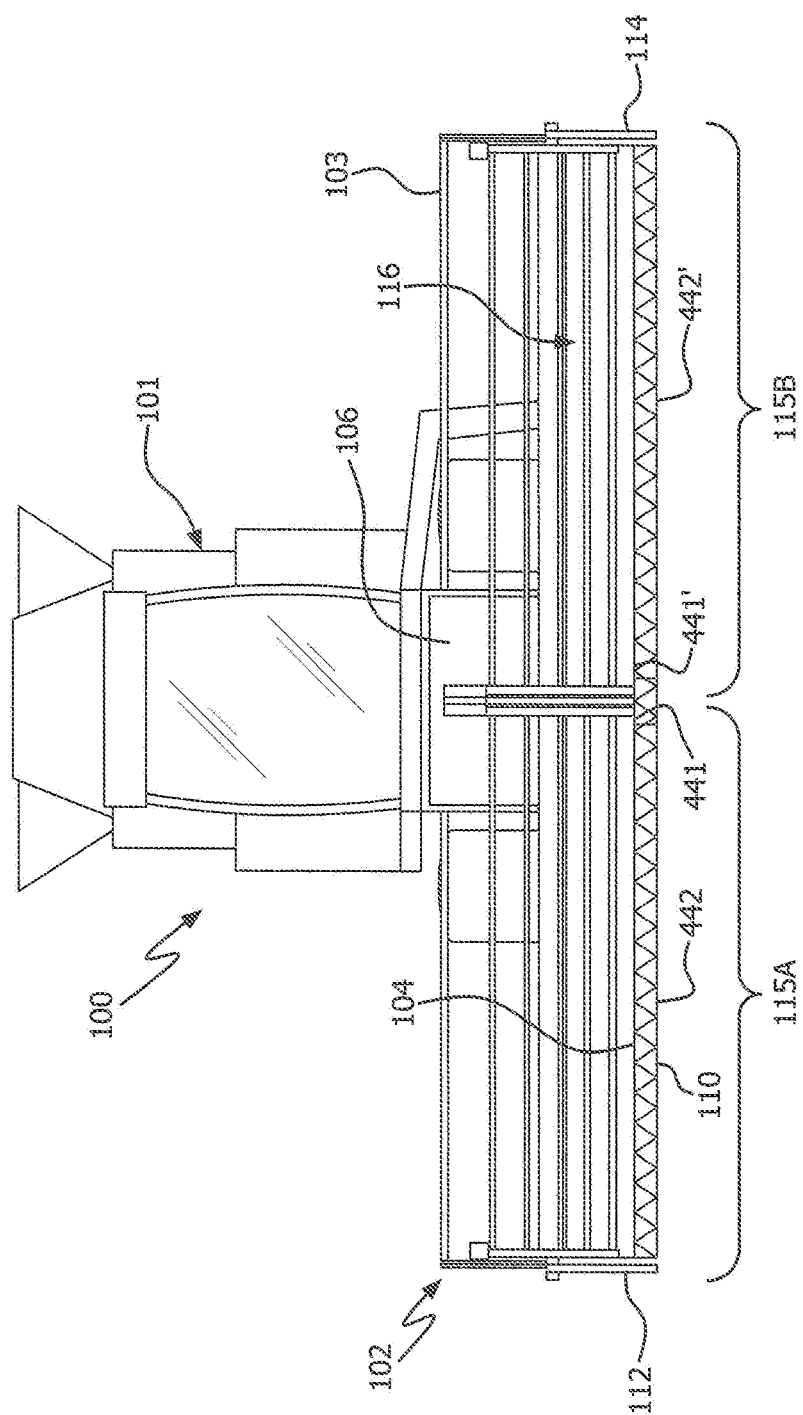
FIG. 1 is a front elevation view of an agricultural harvester including a header equipped with a knife drive in accordance with an exemplary embodiment of the present disclosure.

Reference will now be made in detail to the various exemplary embodiments of the present disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms, such as top, bottom, left, right, above, below, and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops including, but not limited to, wheat, soybeans, and small grains. The terms "debris," "material other than grain," and the like are used interchangeably.

The term "about," as used herein, when referring to a measurable value, such as an amount, a temporal duration, and the like, is meant to encompass variations of ±20%, ±10%, ±5%, +1%, or ±0.1% from the specified value, as such variations are appropriate.

The term "substantially," as used herein, shall mean considerable in extent, largely, but not wholly, that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges, as well as individual numerical values within that range. For example, description of a range, such as from 1 to 6, should be considered to have specifically disclosed subranges, such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester 100, which is configured to cut crops, including (without limitation) small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 115A, 115B extend transversely along a forward edge of the floor 104, i.e., in a widthwise direction of the harvester. The first and second cutting assemblies, described in greater detail hereinafter, are configured to cut crops in preparation for induction into the feederhouse 106.

The header may include one or more draper conveyor belts for conveying cut crops to the feederhouse 106, which are configured to convey the cut crops into the harvester 102 for threshing and cleaning as the harvester 100 moves forward over a crop field. The header 102 may further include an elongated, rotatable reel 116 which extends above and in close proximity to the first and second cutting assemblies. The rotatable reel 116 is configured to cooperate with the one or more draper conveyors in conveying cut crops to the feederhouse 106 for threshing and cleaning. While the foregoing aspects of the harvester are being described with respect to the header shown, the knife drive of the present disclosure can be applied to any other header having use for such a knife drive.

The cutting assemblies 115A, 115E extend along a forward edge 110 of the floor 104, and are generally bounded by a first side edge 112 and an opposing second side edge 114, both adjacent to the floor.

Figure 4:
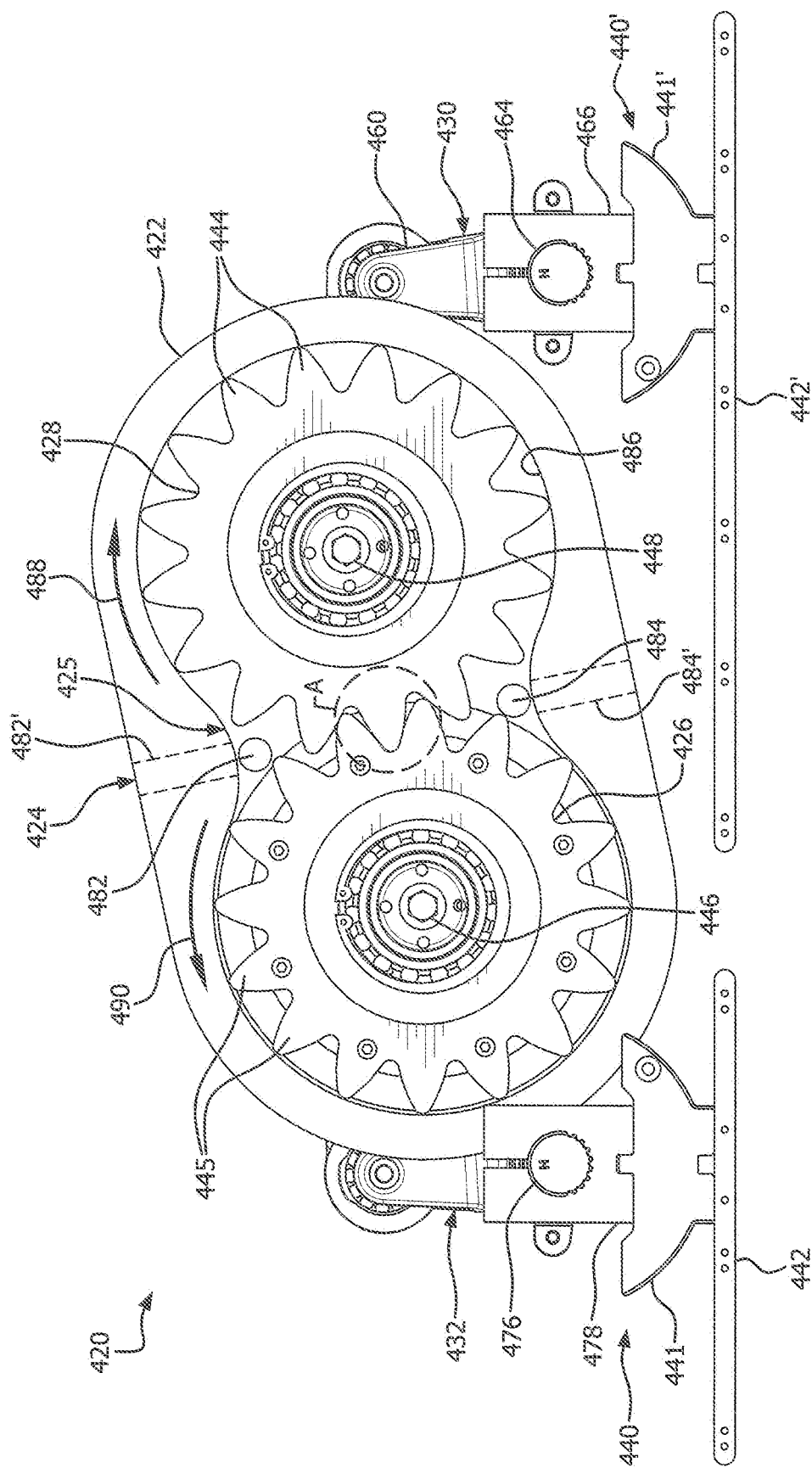
FIG. 4 is a top plan view of a knife drive according to an exemplary embodiment of the present disclosure, with a portion of the housing thereof omitted for clarity of illustration.

According to an exemplary embodiment as shown in FIGS. 1 and 4, the cutting assemblies 115A, 115E include a first cutter bar 442 and a second cutter bar 442'. The cutting assemblies are driven by a knife drive 420 that drives cutter knife heads 441, 441' in oscillating motion whereby the knife heads move laterally to the left and right.

Figure 5:
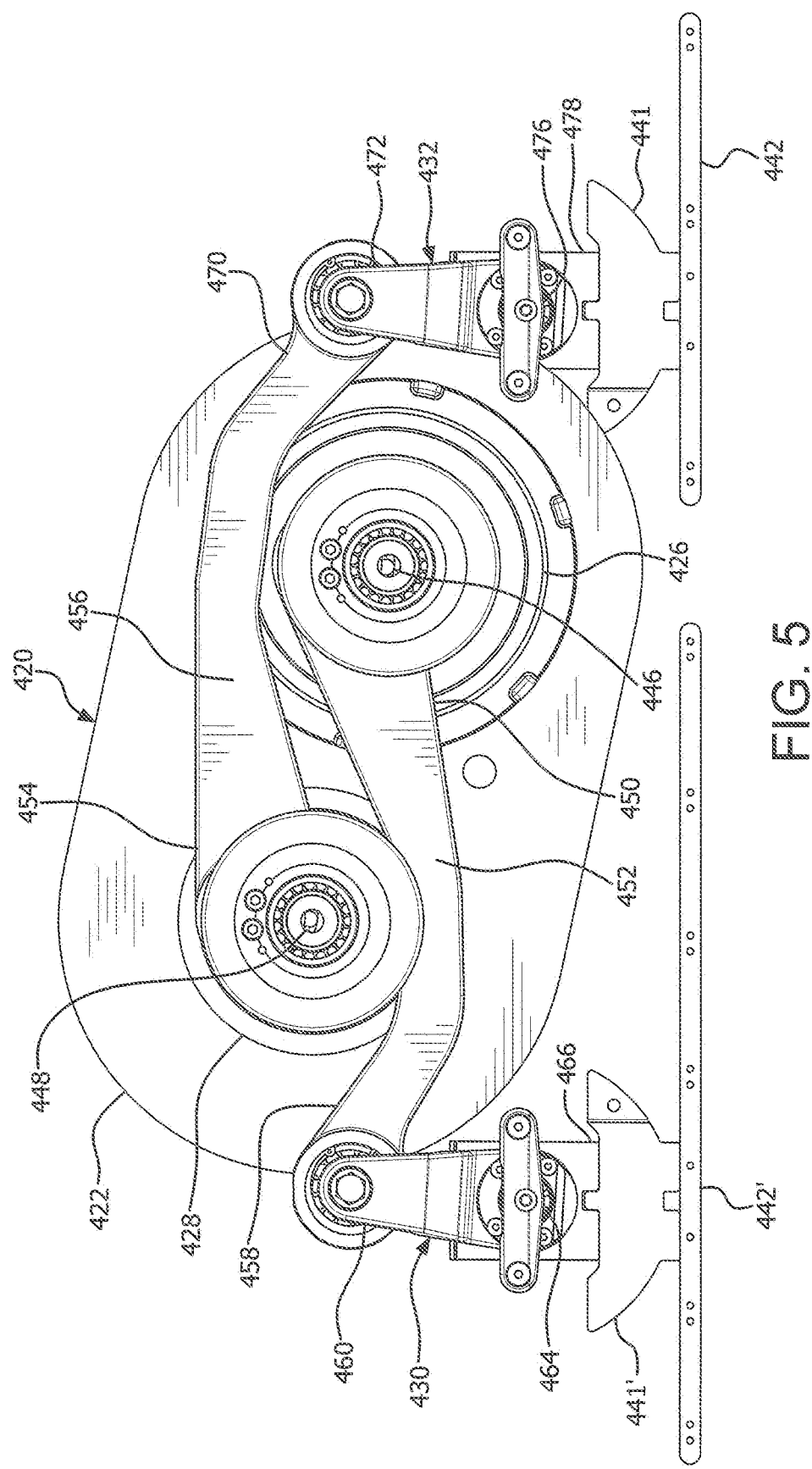
FIG. 5 is a bottom plan view of the knife drive of FIG. 4, with a portion of the housing thereof omitted for clarity of illustration.
Figure 6:
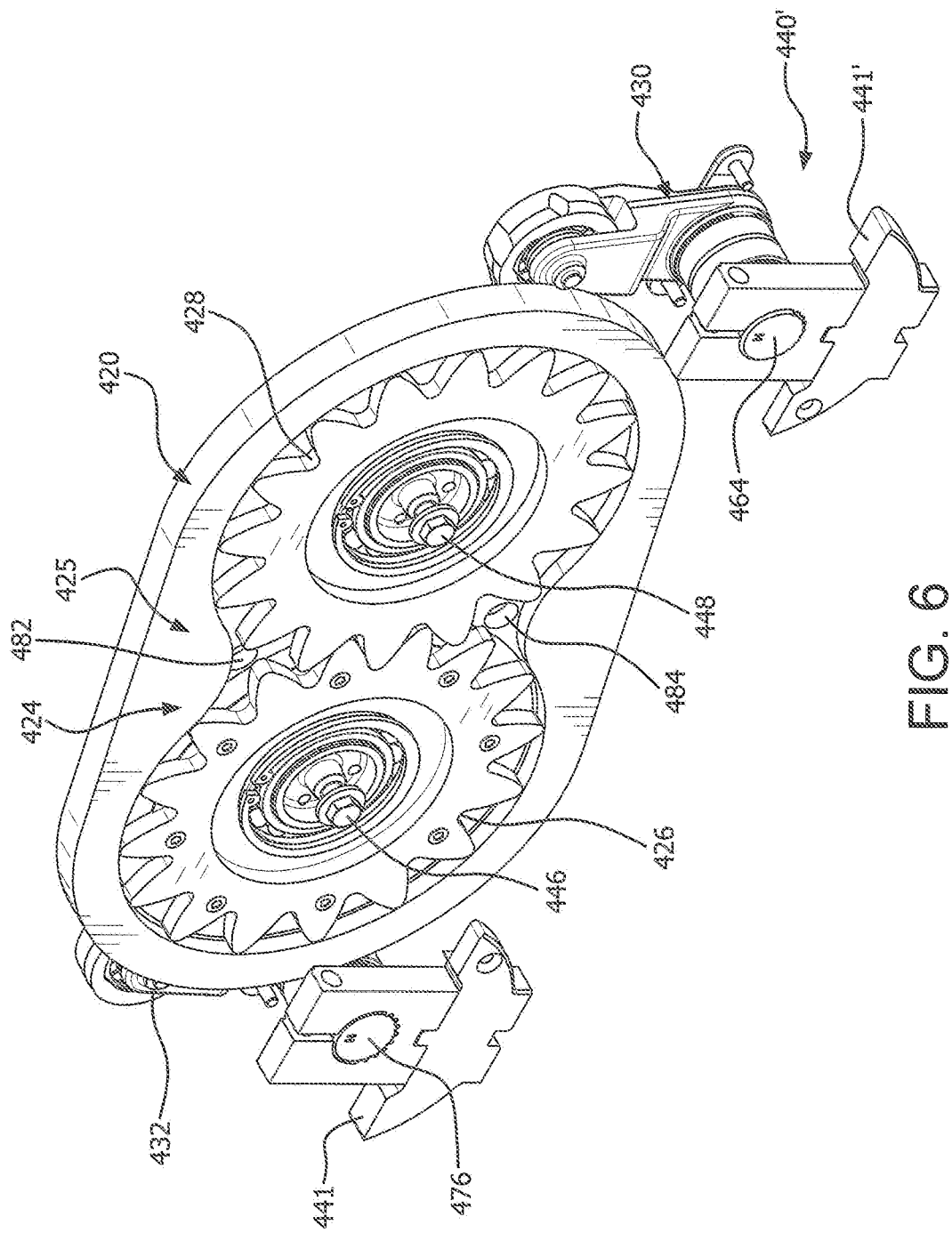
FIG. 6 is a top perspective view of the knife drive of FIG. 4.

Referring to FIGS. 4-6, there is shown a knife drive 420 for a header of an agricultural harvester according to an exemplary embodiment of the present disclosure. The knife drive comprises first and second drive arm assemblies 430, 432 for connecting to respective cutting assemblies 440, 440', including cutter knife heads 441', 441 that are, in turn, connected to cutter bars 442', 442, and a drive unit 424 operatively connected to the first and second drive arm assemblies 430, 432. Exemplary cutter knife heads applicable to the present exemplary embodiments are disclosed in U.S. Pat. Nos. 7,730,709 and 8,151,547, the entire disclosures of which are incorporated herein by reference in their entireties for all purposes.

The drive unit includes a hermetically sealed housing 422. The drive unit includes a first gear 426 and a second gear 428 operatively engageable with the first gear. Each gear is housed within the housing 422. The drive unit also includes a hydraulic fluid inlet 482 and a hydraulic fluid outlet 484 each of which are in in fluid communication with an interior of the housing.

According to another exemplary embodiment of the present disclosure, the header for an agricultural harvester comprises a cutting mechanism that includes a drive mechanism having the knife drive 420. The knife drive 420 comprises the aforementioned first and second drive arm assemblies 430, 432 for connecting to respective cutting assemblies 440, 440', and a drive unit 424. According to an aspect, the knife drive consists essentially of a hydraulic gear motor. Consisting essentially of a hydraulic gear motor means that the knife drive 420 is devoid of any external motor, as well as the attendant drive shaft for driving a bevel gear which, in turn, drivingly rotates the gears within the gearbox.

In accordance with another exemplary embodiment, the drive unit includes a hydraulic gear motor 425 operatively connected to the first and second drive arm assemblies 430, 432. The hydraulic gear motor includes the pair of first and second gears 426, 428 that are oriented to rotate about substantially vertical axes, and the hydraulic fluid inlet 482 and hydraulic fluid outlet 484 are each positioned between the first and second gears 426, 428.

The first and second drive arm assemblies 430, 432 are substantially coplanar with the pair of gears 426, 428 of the hydraulic motor 425. At its periphery, gear 428 has a plurality of teeth 444 which operatively engage peripheral teeth 445 of gear 426. That is, there exists an area "A" at which gear teeth 444 of gear 428 and gear teeth 445 of gear 426 mesh to form a fluid seal between the hydraulic fluid inlet 482 and the hydraulic fluid outlet 484. Rotation of gear 428 in a first direction causes rotation of gear 426 in a second direction opposite the first direction. FIGS. 4-6 further show that gears 426, 428 have centrally located shafts 446, 448, respectively.

The hydraulic gear motor 425 further comprises a first connecting rod or link 452 and a second connecting rod or link 456 (FIG. 5). The first connecting rod 452 is operatively connected to the first gear 426, and the first drive arm assembly, and the second connecting rod 456 is operatively connected to the second gear 428, and the second drive arm assembly.

Alternatively, the first connecting rod can be connected to the second gear and the second connecting rod can be connected to the first gear. Thus, in sum, the first connecting rod can be operatively connected to one of the first and second gears and to the first drive arm assembly, and the second connecting rod can be operatively connected to the other of the first and second gears and to the second drive arm assembly. As shown in FIG. 5, a first end 450 of the first connecting rod 452 is eccentrically mounted about shaft 446 and a first end 454 of the second connecting rod 456 is eccentrically mounted about shaft 448. A second end 458 of the first connecting rod 452 is operatively connected to a first end 460 of the first drive arm assembly 430. The first drive arm assembly 430 is pivotably supported by frame 103 at pivot 464 and has a second end 466 secured to cutter knife head 441' which, in turn, is connected to cutter bar 442'. Likewise, a second end 470 of the second connecting rod 456 is operatively connected to a first end 472 of the second drive arm assembly 432. The second drive arm assembly 432 is pivotably supported by frame 103 at pivot 476 and has a second end 478 secured to cutter knife head 441 which, in turn, is connected to cutter bar 442.

Figure 2:
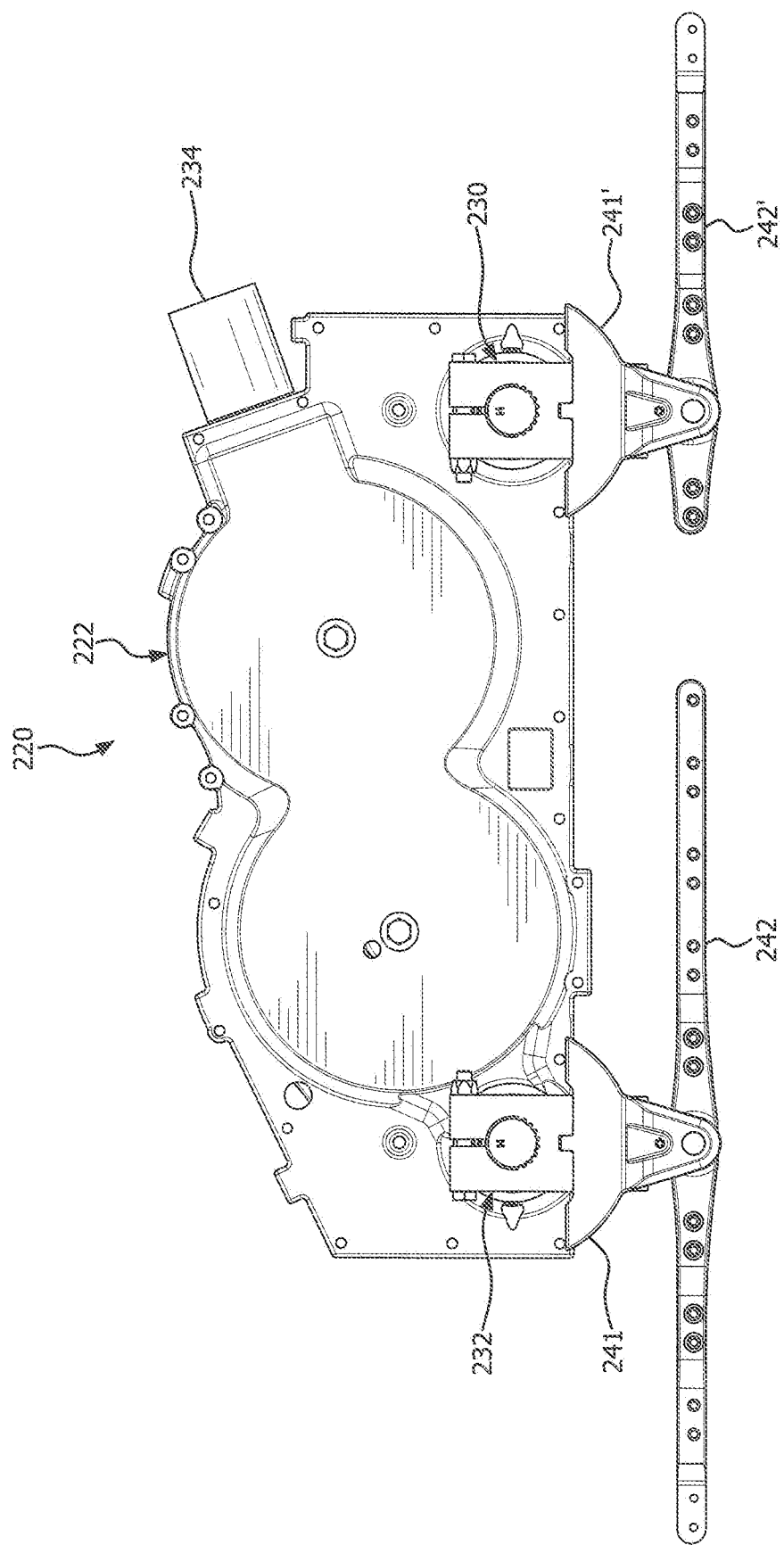
FIG. 2 is a top plan view of a conventional center knife drive.
Figure 3:
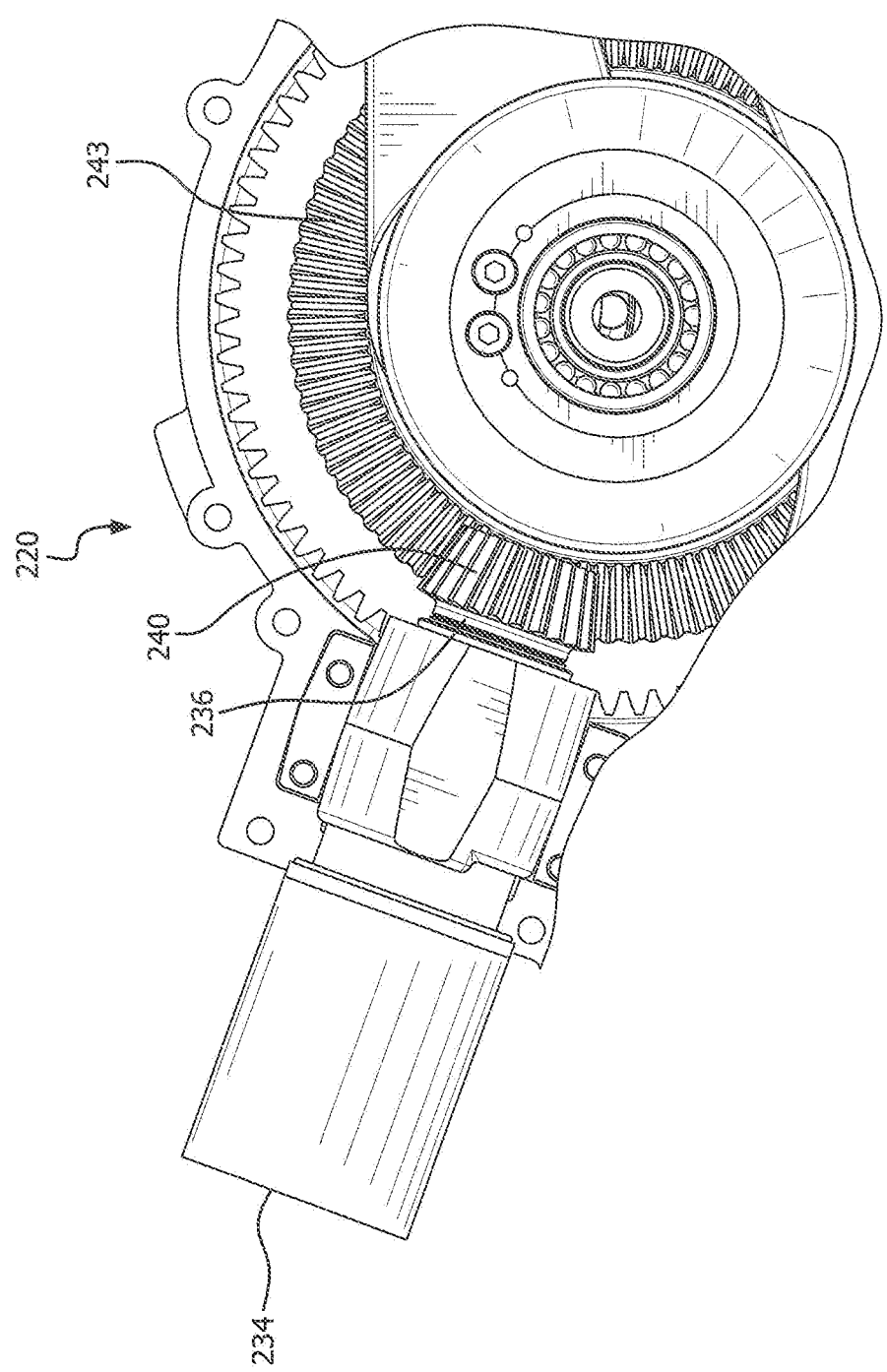
FIG. 3 is a bottom plan view of the center knife drive of FIG. 2, with the housing thereof omitted for clarity of illustration.

Unlike the drives shown in FIGS. 2 and 3, the knife drive 420 of FIGS. 4-6 requires no external motor to provide the motive force to turn the gears 426, 428. Rather, by consisting essentially of a hydraulic gear motor 425, i.e., by lacking an external motor, drive shaft, and bevel gear for driving the gearbox gears, the drive unit 424 relies on fluid flow within the housing 422 from the hydraulic fluid inlet 482 to the hydraulic fluid outlet 484 to rotate the gears 426, 428. The hydraulic fluid inlet 482 and the hydraulic fluid outlet 484 can be configured to face in substantially forwardly or rearwardly directions or, alternatively, face downwardly from the top of the drive unit (as indicated by reference 482') and upwardly from a bottom of the drive unit (as indicated by reference 484').

Figure 7:
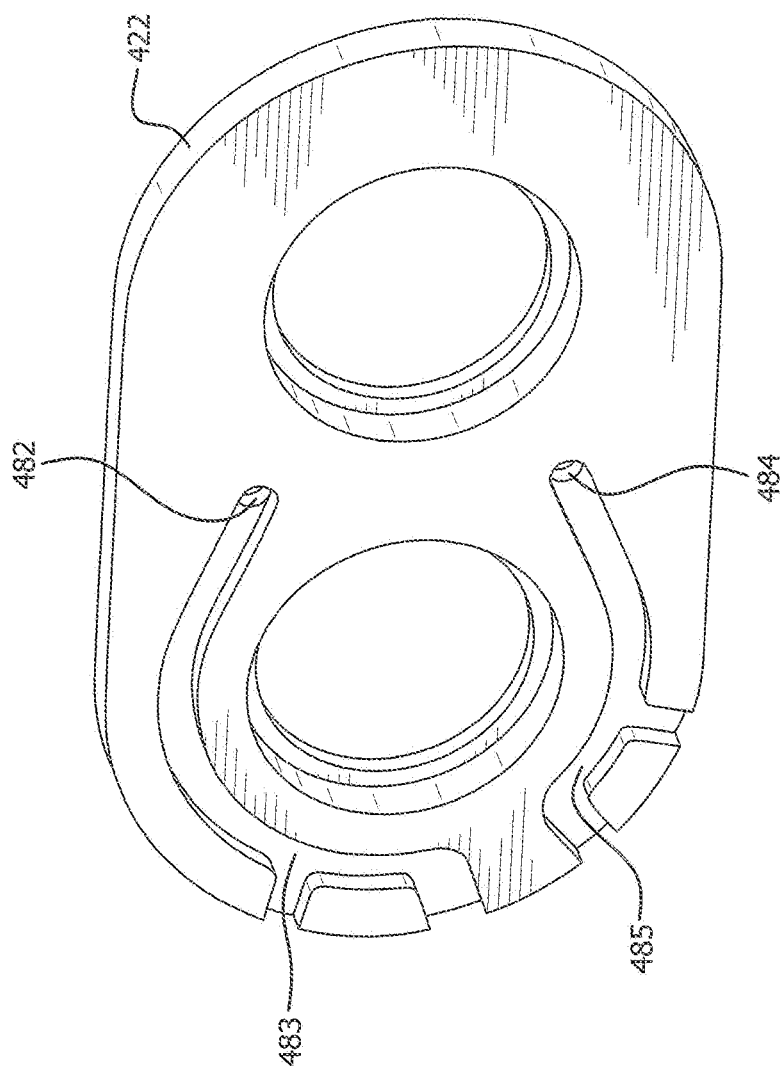
FIG. 7 is a perspective view of the housing of the knife drive of FIG. 4 showing exemplary internal passageways for directing hydraulic fluid, with elements of the knife drive omitted for clarity of illustration.

FIG. 7 shows an exemplary embodiment of the housing 422 that includes optional internal passageways 483, 485 to direct a flow of hydraulic fluid downstream of the hydraulic fluid inlet. The internal passageways 483, 485 can be formed integrally with the housing 422, e.g., such as recessed paths within the housing wall.

Referring to FIG. 4, the incoming hydraulic fluid impinges on the gear teeth 444 and 445 at mesh area "A" whereupon the seal formed by mesh area "A" directs flow downstream of the fluid inlet in opposite directions in the housing 422 along an inner wall 486 of the housing as indicated by arrows 488, 490, thereby causing the gears 426, 428 to rotate in opposite directions. Upon reaching the hydraulic fluid outlet 484, the fluid exits the housing through an internal passageway 485 formed in the housing 422.

It is understood that the header 102 may have its own hydraulic system to circulate hydraulic fluid from the hydraulic fluid outlet to the hydraulic fluid inlet. In other words, the header further can comprise a header hydraulic system in fluid communication with the hydraulic motor 425. Alternatively, hydraulic fluid may be supplied to the hydraulic motor 425 from a hydraulic system carried by the harvester 100.

The meshing gears 426, 428 and first and second drive arm assemblies 430, 432 of knife drive 420 function to minimize vibration during operation of the header. That is, the first ends 450, 454 of the first and second eccentrically mounted connecting rods 452, 456 rotate about shafts 446, 448. As a result, the second ends 458, 470 of the first and second connecting rods 452, 456 and, thus, the first ends 460, 472 of the of the first and second drive arm assemblies 430, 432 oscillate back and forth in opposite directions. In so doing, the second ends 466, 478 of the first and second drive arm assemblies 430, 432 urge the cutter bars 442', 442 respectively secured thereto to likewise oscillate back and forth in opposite directions and along a single plane. Consequently, at one extreme in the motion of the second ends 466, 478 of the first and second drive arm assemblies 430, 432, the second ends 466, 478 are at a minimum transverse distance from one another and at the opposite extreme the second ends 466, 478 are at a maximum transverse distance from one another for purposes of vibration cancellation. As is known, vibration causes wear and tear on the various moving components of a cutter bar knife drive assembly. The center knife drive 420 essentially eliminates vibration, thereby effectively reducing harmful wear and tear.

Referring to FIGS. 2 and 3, there is shown a conventional knife drive 220. Knife drive 220 includes a housing 222 that houses a drive unit. The drive unit comprises a pair of gears that respectively drive a first drive arm assembly 230 and a second drive arm assembly 232. The first and second drive arm assemblies 230, 232 are respectively connected to cutter knife heads 241, 241' that are, in turn, connected to cutter bars 242, 242' in a manner known in the art.

The conventional knife drive 220 is equipped with an external hydraulic or other motor 234 that rotatably drives a drive shaft 236. The drive shaft 236 has a bevel gear 240 provided at its distal end. The bevel gear 240 operatively engages a ring gear 243 whereby rotation of the bevel gear 240 causes rotation of ring gear 243 in a first direction. The external hydraulic motor 234, as well as gears 240, 243 driven by the external hydraulic motor, add space, weight and complexity to the overall drive unit and header.

FIGS. 4-7 show the general shape of the housing 422 of knife drive 420 of the present exemplary embodiment of the subject invention. As can be seen, the separate external hydraulic motor 234 of the conventional drive unit of FIGS. 2 and 3 is eliminated, as is the drive shaft 236 and bevel gear 240. Consequently, the housing 422 assumes a compact shape that is less massive than corresponding housings of conventional center knife drives, such as housing 222 of knife drive 220.

According to the exemplary embodiments of the present disclosure, there is provided a compact drive unit consisting essentially of a hydraulic gear motor operatively connected to the first and second drive arm assemblies. The gears of the hydraulic gear motor function not only to drive the first and second drive arm assemblies but also to time the operation of the first and second drive arm assemblies whereby the respective cutting assemblies oscillate in opposite directions to effectively cancel out vibration during operation of the cutting assemblies. Additionally, by eliminating the separate external hydraulic motor, drive shaft, and driven bevel gear of conventional center knife drives, the drive unit has less mass and is lighter in weight than conventional designs. Moreover, elimination of the bevel gear set of conventional center knife drives reduces the overall height of the gearbox, eliminates the complexity of getting the correct preload on the bevel gears, and improves efficiency by eliminating another heat generating gear. In addition, cut crop must travel over the top of the gearbox onto a belt which then feeds into the harvester. The top of the gearbox is a "dead space" upon which crop can stall. However, due to the short distance (front to back) of the gearbox of the present disclosure, the likelihood of stalled crop is reduced.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A knife drive for a header of an agricultural harvester comprising:
   first and second drive arm assemblies configured to connect to respective cutting assemblies; and
   a drive unit including a hydraulic gear motor operatively connected to the first and second drive arm assemblies, the hydraulic gear motor having a housing with an interior chamber and at least one path recessed into a side wall of the interior chamber.

2. The knife drive of claim 1, wherein the hydraulic gear motor includes a pair of gears rotatable about substantially vertical axes, and wherein each of the first and second drive arm assemblies are substantially coplanar with the pair of gears of the hydraulic motor.

3. The knife drive of claim 1, wherein the hydraulic gear motor comprises:
   a hydraulic fluid inlet in fluid communication with the interior chamber of the housing; and
   a hydraulic fluid outlet in fluid communication with the interior chamber of the housing.

4. The knife drive of claim 3, wherein the hydraulic gear motor further comprises a first gear and a second gear operatively engaged with the first gear, wherein each gear is housed within the housing.

5. The knife drive of claim 4, wherein the hydraulic fluid inlet and outlet are each positioned between the first and second gears.

6. The knife drive of claim 1, wherein the hydraulic gear motor includes a first gear and a second gear, and further comprising a first connecting rod operatively connected to one of the first and second gears and to the first drive arm assembly.

7. The knife drive of claim 6, further comprising a second connecting rod operatively connected to the other of the first and second gears and to the second drive arm assembly.

8. The knife drive of claim 3, wherein the path directs a flow of hydraulic fluid downstream of the hydraulic fluid inlet.

9. A header of an agricultural harvester comprising the knife drive of claim 1.

10. A knife drive for a header of an agricultural harvester comprising:
    first and second drive arm assemblies configured to connect to respective cutting assemblies; and
    a drive unit operatively connected to the first and second drive arm assemblies, including:
    a housing,
    a first gear and a second gear operatively connected to the first gear, each housed within the housing; and
    a hydraulic fluid inlet and a hydraulic fluid outlet, each in fluid communication with an interior of the housing,
    wherein the first and second gears are planar.

11. The knife drive of claim 10, wherein the housing is hermetically sealed.

12. The knife drive of claim 10, wherein the hydraulic fluid inlet and hydraulic fluid outlet are each positioned between the first and second gears.

13. The knife drive of claim 10, further comprising:
a first connecting rod operatively connected to one of the first and second gears and to the first drive arm assembly; and
a second connecting rod operatively connected to the other of the first and second gears and to the second drive arm assembly.

14. The knife drive of claim 10, wherein the housing includes internal passageways to direct a flow of hydraulic fluid downstream of the hydraulic fluid inlet.

15. A header for an agricultural harvester comprising:
a cutting mechanism that includes a drive mechanism consisting essentially of the knife drive of claim 10.

16. The knife drive of claim 10, wherein the housing includes an interior chamber having at least one path recessed into a side wall of the interior chamber and a hydraulic fluid inlet provided on a side of the housing that is substantially parallel to at least one of the first and second gears.

17. A knife drive for a header of an agricultural harvester comprising:
first and second drive arm assemblies configured to connect to respective cutting assemblies; and
a drive unit consisting essentially of a hydraulic gear motor operatively connected to the first and second drive arm assemblies, the hydraulic gear motor comprising:
a housing,
a first gear and a second gear operatively connected to the first gear, each housed within the housing, and
a hydraulic fluid inlet and a hydraulic fluid outlet, each in fluid communication with an interior of the housing,
wherein the hydraulic fluid inlet and the hydraulic fluid outlet are provided on a side of the housing that is substantially parallel to at least one of the first and second gears.

18. The knife drive of claim 17, wherein the hydraulic gear motor further comprises first and second connecting rods each having first ends and second ends, wherein the first ends of the first and second connecting rods are rotatable about respective shafts of the first and second gears, and wherein the second ends of the first and second connecting rods are operatively connected to respective ones of the first and second drive arm assemblies.

19. The knife drive of claim 17, wherein the housing includes an interior chamber having at least one path recessed into a side wall of the interior chamber.

20. The knife drive of claim 19, wherein first and second gears are planar.

* * * * *